(12) United States Patent
Klöppel et al.

(10) Patent No.: US 7,710,890 B2
(45) Date of Patent: May 4, 2010

(54) METHOD FOR DETECTING A SIGNAL PROPAGATION TIME BETWEEN A MOBILE RADIO TERMINAL AND A BASE STATION

(75) Inventors: Silko Klöppel, Berlin (DE); Bert-Uwe Köhler, Falkensee (DE); Carsten Simon, Hennigsdorf-Niederneuend (DE)

(73) Assignee: Cinterion Wireless Modules GmbH, Munich (DE)

( * ) Notice: Subject to any disclaimer, the term of this patent is extended or adjusted under 35 U.S.C. 154(b) by 254 days.

(21) Appl. No.: 10/554,817

(22) PCT Filed: Apr. 25, 2005

(86) PCT No.: PCT/DE2005/000773

§ 371 (c)(1),
(2), (4) Date: Mar. 17, 2006

(87) PCT Pub. No.: WO2005/115037

PCT Pub. Date: Dec. 1, 2005

(65) Prior Publication Data

US 2007/0077935 A1    Apr. 5, 2007

(30) Foreign Application Priority Data

May 19, 2004   (DE) .................. 10 2004 026 79

(51) Int. Cl.
*H04J 3/14* (2006.01)
(52) U.S. Cl. ............. 370/252; 455/450; 455/456.1; 455/456.2; 455/456.5; 455/456.6
(58) Field of Classification Search ............. 370/252; 455/450, 456.1, 456.2, 456.5, 456.6
See application file for complete search history.

(56) References Cited

U.S. PATENT DOCUMENTS

| | | | |
|---|---|---|---|
| 5,502,721 A * | 3/1996 | Pohjakallio | 370/336 |
| 5,924,034 A | 7/1999 | Dupuy | |
| 6,347,228 B1 * | 2/2002 | Ludden et al. | 455/456.5 |
| 6,987,979 B2 * | 1/2006 | Carlsson | 455/456.6 |
| 2002/0191554 A1 * | 12/2002 | Kondo | 370/328 |

FOREIGN PATENT DOCUMENTS

| | | |
|---|---|---|
| DE | 198 36 778 | 2/2000 |
| DE | 101 16 798 | 10/2002 |
| DE | 103 07 592 | 9/2004 |
| EP | 0 800 319 | 10/1997 |
| WO | WO 92/05672 | 4/1992 |

OTHER PUBLICATIONS

ETSI TS 144 018 V5.15.0 (May 2004) Digital cellular telecommunications system (Phase 2+); Mobile radio interface layer 3 specification; Radio Resource Control (RRC) protocol (3GPP TS 44.018 version 5.15.0 Release 5).

* cited by examiner

*Primary Examiner*—Ricky Ngo
*Assistant Examiner*—Luat Phung
(74) *Attorney, Agent, or Firm*—Baker Botts L.L.P.

(57) ABSTRACT

A method for detecting a signal propagation time between a mobile radio terminal and a base station in a mobile radio network in a mobile radio terminal, particularly for the purpose of localizing the mobile radio terminal which inserts a propagation time detection information item into a channel request message in order to signal to the base station that no channel reservation is necessary, and that only the propagation time detection needs to be carried out, so as to achieve significantly reduced loading of network resources.

31 Claims, 2 Drawing Sheets

METHOD FOR DETECTING A SIGNAL PROPAGATION TIME BETWEEN A MOBILE RADIO TERMINAL AND A BASE STATION

FIELD OF TECHNOLOGY

The present disclosure relates to a method for detecting a signal propagation time between a mobile radio terminal and a base station in a mobile radio network in the mobile radio terminal, particularly for the purpose of localizing the latter.

BACKGROUND

To set up a connection between a mobile radio terminal and a base station in a mobile radio network, it is necessary to ascertain the time delay for the signal transmission between the two. This signal propagation time is required in a GSM system, for example, in order to synchronize the uplink bursts from the terminal to the timeslot pattern in the base station.

To this end, the base station determines the signal propagation time from the access bursts transmitted by the mobile station. A channel request message in the GSM system is sent as an access burst of this type. The base station then instructs the mobile station to bring forward its transmission time as appropriate by transmitting the determined signal propagation time to the mobile station in a channel allocation message, in the GSM system the "Immediate Assignment message".

The signal propagation time is indicated in the GSM environment by the "timing advance value" (TA value). This is simultaneously a measure of the mobile station's distance from the respective base station. The TA value can thus be used as a basis for autolocation methods on the mobile station, for example.

The localization of a mobile radio terminal in a mobile radio network forms the prerequisite for providing the numerous "location services". These are services which use different methods to make use of information regarding the position of the terminal or of the equipment user. Besides automatic transmission of the position or of the location in the case of an emergency call, they include position-dependent charging, position-dependent connection setup methods and position tracking, for example as part of traffic monitoring or fleet management.

One localization method is based on determining the cell in which the terminal is located. This provides actually usable statements in the core areas of large towns, in which the cell radii are in ranges of several hundred meters. In rural areas with their large cells, accuracies in the region of several kilometers are not adequate, however.

More accurate methods require expensive additional devices for the terminal. In the case of OTD ("Observed Time Difference") methods, the mobile station has a complex design in order to determine the difference between the arrival times of particular signals that are emitted by a plurality of base stations. Also, a mobile station may be equipped with a GPS receiver, which increases the overall cost.

Other methods require additional devices in the mobile radio network, which likewise means high outlay. Thus, many ToA ("Time of Arrival") methods are based on measuring the arrival times of a signal emitted by the mobile station at a plurality of known locations. This requires that what are known as LMUs ("Location Measurement Units") be placed at numerous locations in the network.

By contrast, methods which use the signal propagation time between the terminal and the base station to determine the interval make it possible to dispense with expensive additional devices in the network. In this context, the mobile radio terminal is usually localized using three TA values ascertained by different base stations. However, these methods having drawbacks associated with their use.

One drawback is that the primary objective of the interchange of channel request and channel allocation messages outlined above is not to determine the signal propagation time and to transmit it to the mobile station, but rather to determine and reserve at least one radio channel for connection setup in the base station for the purpose of further interchange of messages. To this end, the channel allocation message is used to transmit the physical properties of the reserved channel (e.g. frequency, timeslot, subchannel number) to the mobile station.

A TA value is thus recorded in the base station in connection with the simultaneous setup of a connection via the air interface. The request for such a connection is setup with a reservation of at least one signaling channel (in the case of GSM: of a "Dedicated Control Channel") and possibly of a further channel, e.g. a voice channel.

However, there is no requirement for channel reservation if only the signal propagation time is intended to be detected in the mobile station, such as for a terminal-aided localization method. Following receipt of the channel allocation method with the value it contains for the signal propagation time, the aim of the procedure has been achieved from the point of view of the mobile radio terminal. In a GSM system, the mobile station then changes to the RR idle state; the channel reserved by the base station is not required.

The reserved channel is released no earlier than after a few seconds, namely after the base station has detected that the reserved channel is not being used. In a GSM system, a typical value before release is six seconds. For this time, the requested channel is not available to other mobile stations for connection setup. This practice therefore wastes network resources. This problem has been an obstacle to acceptance of the inherently simple localization method described above to date, and hence to the use of localization methods on the whole.

SUMMARY

Accordingly, a method and system for detecting a signal propagation time between a mobile radio terminal and a base station in a mobile radio network in the mobile radio terminal is disclosed in which, propagation procedures are processed to reduce the loading of network resources, particularly via the air interface.

As the name suggests, the purpose of a channel request message is to request a channel for connection setup (via the air interface) in order to reserve the channel. Under the present disclosure, the channel request message is used to transmit a propagation time detection information item to the base station. This information item informs the base station that detection of the signal propagation time needs to be carried out only in a mobile station, and channel reservation is therefore not necessary.

The use of the channel request message in this manner provides an effective solution to the problem described above. This is because modification of the standard channel request message allows previously unnecessarily reserved channels, i.e. network resources, to be saved. The use of localization methods based on the detection of signal propagation times in the mobile station, for example, thus has far lesser effects on the utilization level of devices in mobile radio networks. As a result, the aforementioned configuration should find far greater acceptance and support among the network operators.

Under an exemplary embodiment, a method for detecting the signal propagation time between a mobile radio terminal and a base station in a mobile radio network in the mobile radio terminal is disclosed, particularly for the purpose of localizing the latter, in which a channel request message is generated by the mobile radio terminal and is sent to the base station, the channel request message being provided in order to prompt the base station to determine a channel for transmitting further messages and to reserve this channel in order to set up a connection, in response to the channel request message, the base station records the signal propagation time to allow the mobile radio terminal to be synchronized to the timeslot pattern in the base station in order to continue connection setup, a channel allocation message is generated by the base station and is sent to the mobile radio terminal, said channel allocation message being provided in order to indicate the values of channel parameters for the reserved channel and indicating the value of the signal propagation time.

Furthermore, the mobile radio terminal can insert a propagation time detection information item into the channel request message in order to use the channel request message to signal to the base station that no channel reservation but only propagation time detection needs to be carried out.

Under the embodiment, the channel request message is evaluated by the base station to determine whether the propagation time detection information item is present, and in response to a positive evaluation result, the base station does not reserve a channel. This requires just minimal additional functionality in the base station in order to ensure that a channel reservation functionality is not called and the signal propagation time is just determined. Altered handling in further network devices, such as an MSC in a GSM network, is not required.

Under another exemplary embodiment, the propagation time detection information item is inserted as a prescribed parameter value for a parameter of the channel request message, and the parameter may assume at least one further value which does not relate to the propagation time information item. As a result, a change to the message format of a standard message becomes superfluous, for example the channel request message in a GSM system. Only a parameter whose permitted values are represented by a multibit field in the channel request message has a further admissible, i.e. significant, value added to it. To this end, a value or a bit combination is preferably used which had been unused to date (usually denoted by "reserved for future use" in the standard). Hence, only minimal changes are required in order to generate and evaluate the channel request message.

Under yet another exemplary embodiment, the parameter of the channel request message is evaluated by the base station in order to determine the type of channel which is to be reserved. This parameter is suitable because during evaluation in the base station it ought conventionally to be closely linked to the calling of a channel reservation functionality. The inventive modifications are particularly simple to implement with great reuse or further use of known functionalities. In the GSM standard, this parameter is the "Establishment Cause", which is indicated by an octet in the change request message. This has a plurality of bit combinations which have not been used to date, that is to say that it is certainly possible to reserve a bit combination as a parameter value for the inventive propagation time detection information item.

Under yet another exemplary embodiment, the mobile radio terminal takes the value of the signal propagation time from the channel allocation message, but not the values of the channel parameters. Since the method involves the base station carrying out no channel reservation, there can also be no useful values for the channel parameters in the message. Ignoring the parameters thus simplifies and speeds up the handling of the message in the mobile radio terminal in comparison with the conventional handling, without this resulting in drawbacks.

Under yet another exemplary embodiment, the base station inserts channel parameters with random values or with values firmly prescribed in the base station into the channel allocation message. This allows the resources required for creating an inventive channel allocation message to be minimized in the base station, since the channel parameters in the mobile station are not used anyway, preferably are not even read in the first place.

The selection of a base station to which the channel request message is sent can also bypass the use of the cell and/or network selection criteria implemented in the mobile radio terminal. In other words, the mobile radio terminal sends the channel request message to the base station, even though the cell and/or network selection criteria implemented in the mobile radio terminal do not permit connection setup via this base station. In this regard, it is also possible to use base stations which cannot be used in conventional methods for detecting propagation time in the terminal. Hence, the number of available base stations and accordingly the accuracy of localization of the mobile radio terminal, for example, are increased.

Furthermore, the base station may also transmit a supporting information item to the mobile radio terminal which indicates that the base station is configured to perform only propagation time recording without channel reservation. In this regard, the base station is configured to carry out the methods disclosed herein. The mobile station can evaluate this supporting information and, for example, for propagation time detection, can use the base station in preference, or just not use it, if it is not designed to carry out the resource-saving method based on the present disclosure.

A conventional mobile radio terminal or a conventional mobile station, which may also be in the form of a wireless module, may also be developed in line with the invention such that a module for generating a channel request message is designed to insert a propagation time detection information item into a channel request message in response to a command to generate a message from a unit for detecting the propagation time, in order to signal to an addressed base station that no channel reservation, but only propagation time detection needs to be carried out.

Likewise, a base station, and particularly a module for channel allocation, is proposed such that the module does not reserve a physical channel in a channel use memory in response to evaluation of a channel request message, which contains a propagation time detection information item in a module for evaluating the channel request message, the propagation time detection information item indicating that no channel reservation but only propagation time detection needs to be carried out.

BRIEF DESCRIPTION OF THE DRAWINGS

The various objects, advantages and novel features of the present disclosure will be more readily apprehended from the following Detailed Description and when read in conjunction with the enclosed drawings, in which.

DETAILED DESCRIPTION

In the figures, elements which are the same and have the same effect are provided with the same reference symbols.

Figure 1:
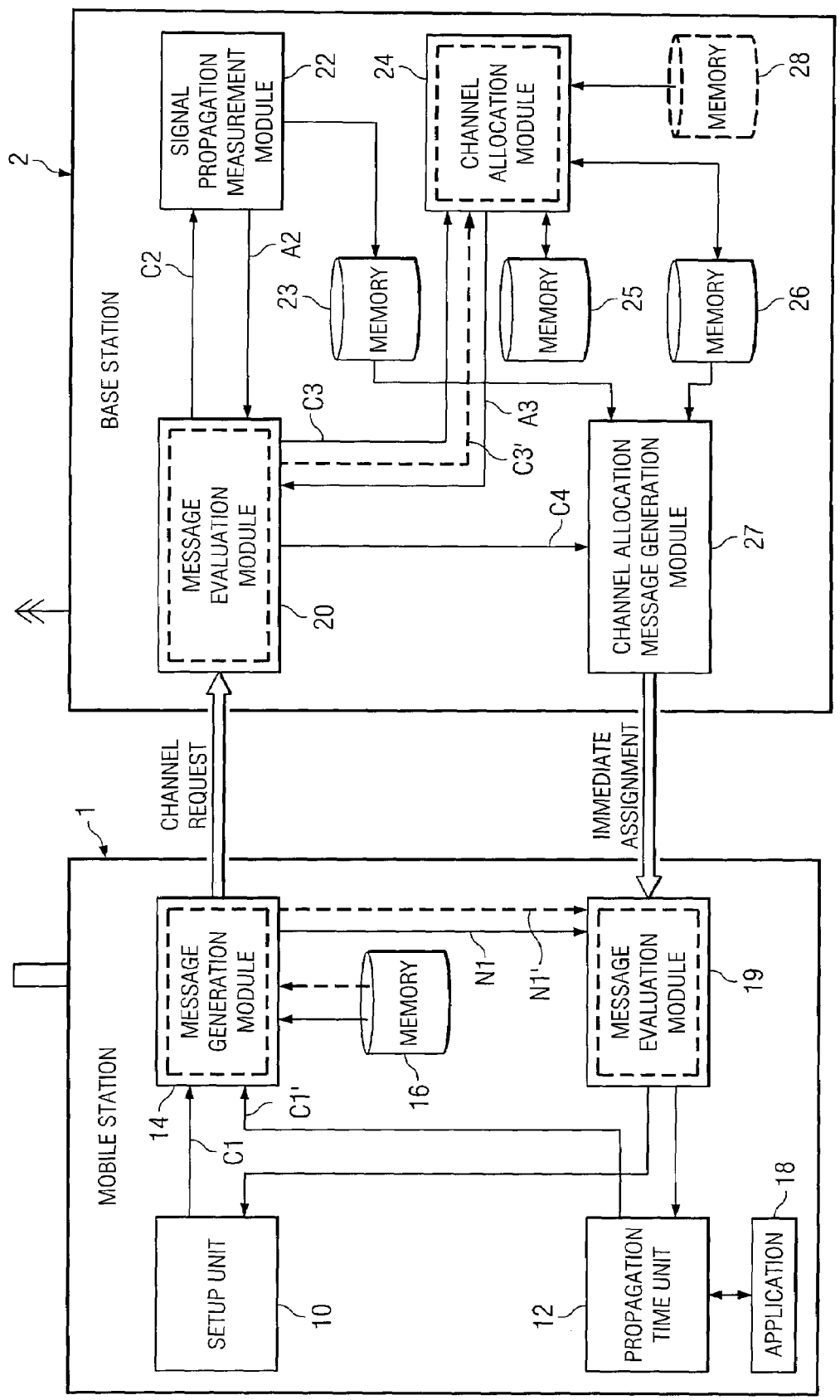
FIG. 1 illustrates an arrangement with a mobile station and a base station under an exemplary embodiment.

FIG. 1 uses a functional block diagram to show the components of a mobile radio terminal 1 and of a base station 2, insofar as they are fundamental to understanding the invention. In this context, the transmission of station-internal commands and acknowledgements is respectively shown in dashes and in solid lines, insofar as the conventional method or the method developed further in line with the invention is concerned. Functional units which have been modified in comparison with the prior art in order to carry out the present disclosure are shown with a double border.

The base station 2 is one of a multiplicity of devices in a mobile radio network (not shown in more detail) which is preferably based on the GSM standard. Accordingly, the mobile station 1 is designed for setting up connections using this GSM network.

The description of the components first of all discusses the conventional sequence of a method for detecting the signal propagation time in the terminal 1. The discussion then continues with how the method is developed further in line with the invention.

The mobile station 1 contains a connection setup unit 10 and a propagation time detection unit 12 as is known in the art. The connection setup unit 10 is triggered by further units (not shown) in the terminal 1 in order to initiate setup of a connection (and possibly in order to perform further connection-related tasks, for example clearing down the connection later). To set up a connection, the setup unit 10 initiates and performs numerous processes which are known to the person skilled in the art and are therefore not discussed in more detail here. A fundamental concept in connection with the present disclosure is that the connection setup unit 10 sends a message generation command C1 to a channel request message generation module 14.

The propagation time detection unit 12 is actuated by an application 18, shown schematically in FIG. 1. Under the exemplary embodiment this application is preferably a Java application for localizing the terminal. For this purpose, the application 18 requests at least three timing advance values from the unit 12. From further units (not shown) in the terminal 1, the application 18 also requests the geographical positions of the base stations from which the TA values have been detected. From these, the application 18 finally calculates the geographical coordinates of the terminal 1.

So that the application 18 can carry out localization, the unit 12 uses a control command C1' to transmit an instruction corresponding to the command C1 to the message generation module 14, but with the difference that a respective TA value needs to be requested not from one but rather from three base stations. Accordingly, the module 14 takes from the carrier frequency memory 16 the three base stations, or their frequency carriers, with the strongest reception (for reasons of clarity, only the message interchange to the base station 2 is dealt with).

The terminal-internal commands C1 and C1' are the same design, apart from the statement regarding the number of channel request messages to be created, i.e. they otherwise differ only in terms of the unit (12 or 10) which generates and sends them.

Module 14 in this embodiment reacts to the command C1 in exactly the same way as to the command C1' by generating one or more channel requests. To this end, the module 14 accesses a carrier frequency memory 16. The latter stores the carrier frequencies which are received at the current location of the terminal 1 within the context of the GSM standard used. It also stores those carrier frequencies of base stations whose reception strengths cannot be used according to the GSM cell selection criteria (for example the "C1 criterion"). In addition, base stations in a plurality of mobile radio networks may be stored that are available at the location of the terminal 1. In one refinement of the outlined example, the terminal might be suitable not only for one particular GSM network but also, by way of example, for different GSM substandards (GSM 900, 1800, PCM 1900) or else might be designed for communication with UMTS networks. The carrier frequencies of the corresponding base stations might therefore likewise be in stored form.

The carrier frequencies of the individual base stations, to be more precise of the BTS devices in the base stations, are organized in the memory 16 according to decreasing reception field strength. Provided that priority criteria, for example, do not get in the way, the module 14 conventionally selects, as addressee for the channel request message which is to be created, that/those base station(s) whose frequency carrier(s) is/are received at the strongest level.

In addition, terminal 1 contains a channel allocation message evaluation module 19, which is described in more detail below.

The base station 2 has a channel request message evaluation module 20. This module evaluates the channel request message received from the mobile station 1, as is known in the art. In this context, module 20 sends a signal propagation time measurement command C2 to a signal propagation time measurement module 22. This module measures the access burst received as part of the channel request message and determined therefrom the timing advance value, i.e. the signal propagation time between the terminal 1 and the base station 2. The TA value is stored by the module 22 in a signal propagation time memory 23. At the same time, the module 22 transmits an acknowledgement A2 to the module 20 in order to indicate that the TA value is available for retrieval in the memory 23.

Module 20 also transmits a channel allocation command C3 to a channel allocation module 24 in response to the receipt of the channel request. The channel allocation module determines a free channel for the connection setup between the terminal 1 and the base station 2 via the air interface by accessing a channel use memory 25 which stores all of the available channels with their use status—reserved or free.

Module 24 uses a prescribed, known algorithm to select a free channel and enters the status "reserved" for this channel into the memory 25. The physical parameters of the reserved channel are stored in a channel parameter memory 26. Specifically, the example outlined here involves the reservation of an SDCCH channel (explained further below). The channel reservation is terminated by the transfer of an acknowledgement A3 to the module 20, said acknowledgement indicating that the channel reservation is complete and channel parameters are available for retrieval in the memory 26.

In response to the receipt of the acknowledgement A2 and A3, the evaluation module 20 transmits a message generation command C4 to a channel allocation message generation module 27. This instructs the message generation module 27 to take the value for the signal propagation time from the memory 23 and to take the values of the channel parameters for the reserved channel from the memory 26 and to insert them into a GSM channel allocation message. This Immediate Assignment message is then transmitted to the terminal 1.

From the Immediate Assignment message sent by the base station 2 in response to the channel request, the channel allocation message evaluation module 19 takes the parameters of the channel reserved in the base station 2 for setting up the connection and also the TA value which is likewise supplied. On the basis of the internal control command N1 from the message generation module 14, the module 19 forwards the channel parameters and the TA value which have been taken to the connection setup unit 10 and/or the TA value which has been taken to the propagation time detection unit 12. The command N1 is discussed in more detail below in connection with the invention.

The previously outlined sequence corresponds to a conventional channel request method, as is also used for detecting the signal propagation time in the terminal 1, to be more precise the detection unit 12. The sequence based on the prior art is likewise shown in FIG. 3 in the form of a message flowchart. The channel request message sent from the terminal 1 to the base station 2 is sent on the random access channel (RACH). The message contains a "random reference" for identifying the mobile station 1 to the base station 1. Details regarding the channel request (and also regarding the immediate Assignment) are described in 3GPP TS 44.018, for example.

In addition, an "Establishment Cause" is part of this message in line with the GSM standard. Since only the detection of the signal propagation time needs to be carried out in the mobile station 1, it is possible to choose any Establishment Cause. In the example shown in FIG. 3, the reason "Other Procedures" is chosen, in line with a bit combination 0001xxxx in the appropriate field of the message.

In response to the request message received. (i.e., its Establishment Cause), the message evaluation module 20 triggers reservation of at least one channel in the base station 2. Depending on the request, various "dedicated channels" may be involved, e.g. a TCH ("Traffic Channel", user data channel) or an SDCCH "Standalone Dedicated Control Channel", signaling channel).

In the above example, reservation of a signaling channel is triggered, such as a SDCCH channel. In addition, the GSM timer T3101 is started, which indicates how long the SDCCH channel is reserved for the mobile station 1. In this exemplary embodiment, the timer is six seconds. The channel is released only after the timer T3101 has run out and after the base station has detected that the reserved channel has not been used. To give the mobile stations time for the connection setup and to allow for any transmission difficulties via the air interface, the timer T3101 is usually set to a value of a few seconds.

In addition, as already outlined above, determination of the TA value (in the signal propagation time measurement module 22) of the base station 2 is initiated. When the TA value has been determined and the SDCCH channel has been reserved, an Immediate Assignment with a channel description and also a TA value is returned from the base station 2 to the mobile radio terminal 1. This transmission is effected using the CCH ("Common Control Channel"). For the further communication between the mobile station 1 and the base station 2, the SDCCH allocated by the base station 2 will then be used.

Since the mobile station 1 wants to measure only the TA value, however, it changes back to the RR idle state after receiving the Immediate Assignment and hence the TA value. The SDCCH channel reserved by the base station 2 is therefore not needed at all.

Figure 3:
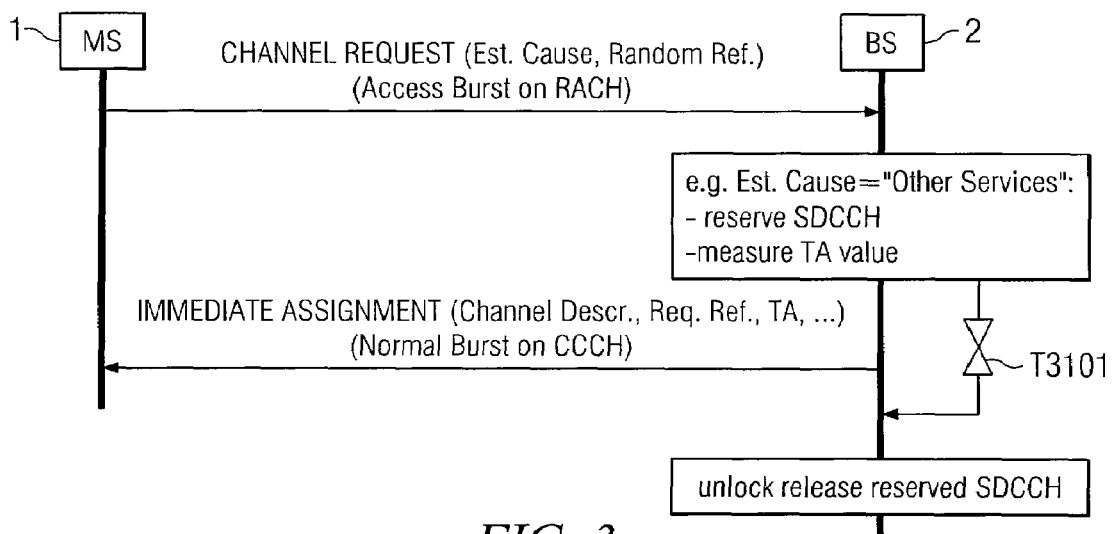
FIG. 3 illustrates a method sequence according to the prior art.

FIG. 3 shows very clearly the problem with this conventional method for detecting the signal propagation time in the mobile radio terminal: the timer T3101 runs out after a very long period, compared with typical connection setup processes executed on timescales of 100 milliseconds. During this period, the reserved SDCCH channel is not available for connection setup by other mobile radio stations. If localization services were widely used in mobile stations, this would result in a corresponding waste of network resources. In other words, the network operators need to effect substantial over-provisioning in comparison with a previously customary network extension, so as now additionally to be able to support a given number of terminals with localization services.

Referring back to FIG. 1, it is assumed that the double-bordered functional components are now designed in line with the invention, as will be described in detail. The single-bordered units or modules remain unchanged in comparison with conventional components.

The starting point here is that the propagation time detection unit 12, triggered by the Java application 18, transmits a message generation command C1' to the message generation module 14, as in conventional fashion.

Module 14 is configured to recognize that the command C1' is coming from the unit 12, but not from the unit 10. In response to this, the module 14 inserts a "TA measurement" into the channel request message as Establishment Cause. This is done using the binary value 01100x01, which is unused on the basis of the present standard ("reserved for future use").

Module 14 is also developed further in another aspect: so that the application 18 can perform localization, the unit 12 uses the control command C1' to transmit the instruction to the message generation module 14 to request a respective TA value from three base stations (as already outlined above). Accordingly, the module 14 takes the three base stations, or their frequency carriers, with the strongest reception from the carrier frequency memory 16 (for reasons of clarity only the message interchanged to the base station 2 is dealt with).

In line with the invention, the base stations do not have to be base stations in the mobile radio network of the base station 2, in which the terminal 1 is registered. Although such base stations, or else base stations with a weak reception level, are not suitable for connections set up at the location of the terminal 1 on the basis of the cell and network selection criteria of the GSM network, the module 14 nevertheless creates and sends channel request messages for the carrier frequencies or base stations with the strongest reception, which are stored in the memory 16, in response to the message generation command C1' from the propagation time detection unit 12. This makes sense because it is not necessary to set up a connection. In particular, the number of base stations available (for propagation time detection or localization) is thus increased.

Figure 2:
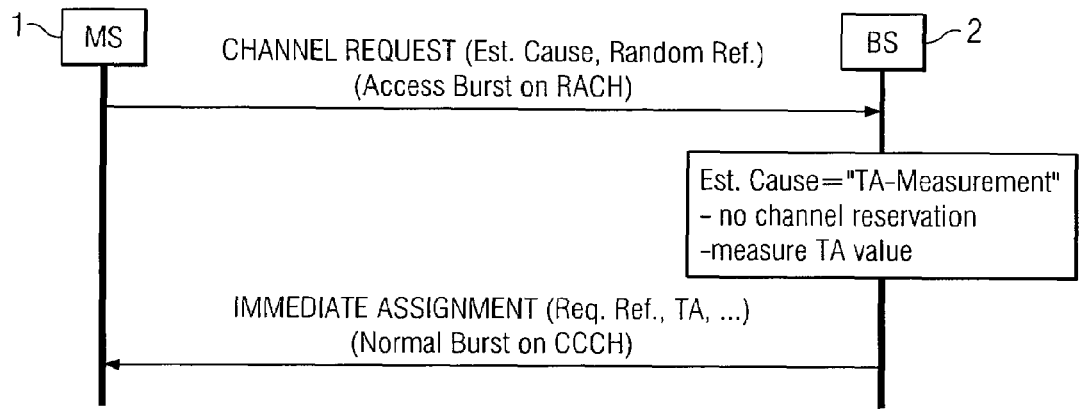
FIG. 2 illustrates a message flowchart and sequence between the mobile station and the base station from FIG. 1.

The channel request is therefore provided with the Establishment Cause "TA measurement", but is otherwise generated by the module 14 in conventional fashion and sent to the base station 2 via the air interface (the same applies to the channel requests to the two further base stations, which are not shown in FIG. 1). FIG. 2 gives a further illustration of the message flow in comparison with the method based on the prior art from FIG. 3.

On its frequency carrier, the base station 2 receives the channel request message formed in line with the present disclosure. The message evaluation module 20 (cf. FIG. 1) is developed in line with the present disclosure for the purpose of evaluating the Establishment Cause for the bit combination with the meaning "TA measurement".

In response to the detection of this bit combination, the module 20 transfers, in line with the present disclosure, a channel allocation command C3' to the channel allocation module 24. From this command C3', the module 24 configures a virtual (i.e., fictitious) channel to be reserved. In response to this command C3', the module 24 accesses a constant memory 28 which stores values for channel parameters of the virtual channel as constants, i.e. in firmly prescribed form. These values do not correspond to a physical channel, however. In particular, the reservation of this channel is monitored by a timer whose time runs out at zero seconds, i.e. the channel is immediately released again and is subsequently available for further propagation time detection by other or the same mobile station. The constant values from the memory 28 are entered into the channel parameter memory 26. As in the case of the conventional method, an acknowledgement message A3 is then returned to the module 20. In this way, implementing the inventive method requires only minimal intervention in the implementation of the channel allocation module 24.

As time progresses, in the same way as in the conventional method, the message generation module 27 creates an Immediate Assignment in response to the message generation command C4, and the values stored in the memories 23 and 26 are inserted into said Immediate Assignment. The "starting time" is omitted as an optional parameter of the Immediate Assignment message from the message generation module 27. In the example outlined here, it is thus not necessary to modify the message generation module 27 in order to carry out the presently disclosed method.

In the exemplary embodiment outlined here, the base station is also modified in another way, which is not illustrated in FIG. 1; this is because it is designed to transmit a supporting information item to the mobile radio terminal 1.

This supporting information item is used to indicate that the base station 2 actually supports the Establishment Cause "TA measurement". The supporting information item in question is inserted into the "SI3 Rest Octets" (cf. 3GPP TS 44 018). These are regularly sent on the BCCH ("Broad Control Channel") in the System-Information-3. The mobile radio station 1 needs to have received the System-Information-3 at least once before every propagation time measurement in order to find out the necessary cell and RACH access parameters for the channel request. For transmitting the supporting information item, the SI3 Rest Octets are expanded by a new bit "TA measurement supported" (bit values L="not supported", H="supported").

If a plurality of mobile radio terminals in the cell of the base station 2 each need to be supplied with an Immediate Assignment message, then according to the GSM standard the base station 2 can also generate and send an Immediate Assignment Extended message, as is known to the person skilled in the art. For generating this message, the above statements relating to the generation of the Immediate Assignment message apply mutatis mutandis.

In the mobile station 1, the message generation module 14 has transferred an internal notification N1' to the channel allocation message evaluation module 19 after sending the channel request to the base station 2. Like the conventional notification N1, the internal notification contains the "random reference" (already mentioned above) of the channel request message, and also, in line with the invention, a statement indicating that it is merely necessary to detect the propagation time, for example the value of a Boolean variable "connection setup". Since it is merely necessary to detect the propagation time, the value of the variable is set to "false".

The identification coefficient for the Random Reference is returned in the "Request Reference" parameter of the Immediate Assignment message and is used by the message evaluation module 19 to associate the value of the variable "connection setup" (and of other, known control variables) with received messages.

The variable value "false" transferred with the N1' stipulates that the received Immediate Assignment does not relate to the setup of a connection, i.e. that only the TA value in this message is of importance. Accordingly, the module 19 evaluates only the following parameters from the Immediate Assignment message (cf. TS 44.018):

Protocol Discriminator (=RR Management),
Skip Indicator,
Message Type (=Immediate Assignment),
Request Reference and
Timing Advance.
All other ("mandatory" and "conditional") parameters
Page Mode,
Dedicated Mode or TBF,
Channel Description or Packet Channel Description,
Mobile Allocation and
IA Rest Octets are ignored by the module 19 of the mobile station 1.

Before the actual creation of the Channel Request message, the terminal 1 has evaluated those SI3 Rest Octets transmitted with a System-Information-3 by the base station 2 in which the "TA-Measurement" bit was set (=supported). In response to this, the carrier frequency memory 16 has been accessed in order to mark the frequency carrier stored therein for the base station 2 such that the message generation module 14 is able to recognize, upon its next access for propagation time detection, that this base station is designed to carry out the inventive method (i.e. it is possible to detect a propagation time using this base station in a manner such that the network resources are saved). The module 14 is designed to use the base stations correspondingly marked in the carrier frequency memory 16 in preference for the propagation time detection.

The TA value contained in the Immediate Assignment is taken by the module 19 and transferred to the propagation time detection unit 12 in conventional fashion.

The introduction, described here, of an Establishment Cause "TA-Measurement" into the Channel Request message makes it a simple matter to prevent network resources from being reserved unnecessarily during the TA measurement. The inventive method for propagation time detection in the mobile radio terminal is an inexpensive alternative in comparison with network-based methods or with the use of a GPS receiver in the mobile station. The attainable accuracy of this method is sufficient for many applications (for example location services).

If a base station is not designed to carry out the resource-saving method described here, it might be designed to report this using the unset TA-Measurement bit in the system information item so that mobile stations can react thereto by using other base stations in preference for propagation time measurements, for example, or applying the non-resource-saving method.

It should be understood that various changes and modifications to the presently preferred embodiments described herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A method for detecting a signal propagation time between a mobile radio terminal and a base station for the purpose of localizing the mobile radio terminal, the method comprising the steps of:
generating a channel request message in the mobile radio terminal, wherein the channel request message is provided in order to prompt the base station to determine a physical channel for transmitting further messages and to reserve the physical channel in order to set up a connection;
transmitting the channel request message to the base station;
receiving a channel allocation message from the base station, wherein the channel allocation message comprises:
data related to channel parameters of the physical channel reserved in the base station for transmitting further messages in accordance with the channel request message;
a signal propagation value for synchronizing the mobile radio terminal to a timeslot pattern in the base station in order to continue connection setup; and
inserting a propagation time detection information item into the channel request message at the mobile radio terminal in order to use the channel request message to signal to the base station that only propagation time detection needs to be carried out without reservation of the physical channel.

2. The method according to claim 1, wherein the channel request message is evaluated by the base station to determine whether the propagation time detection information item is present, and in response to a positive evaluation result the base station does not reserve the physical channel.

3. The method according to claim 1, wherein the propagation time detection information item is inserted as a prescribed parameter value for a parameter of the channel request message, and the parameter is configured to take at least one further value which does not relate to the propagation time information item.

4. The method according to claim 3, wherein the parameter of the channel request message is evaluated by the base station in order to determine the type of channel which is to be reserved.

5. The method according to claim 1, wherein the mobile radio terminal processes the value of the signal propagation time from the channel allocation message, but not the values of the channel parameters.

6. The method according to claim 1, wherein the base station inserts channel parameters with random values or with values firmly prescribed in the base station into the channel allocation message.

7. The method according to claim 1, wherein the selection of the base station to which the channel request message is sent does not involve the use of the cell and/or network selection criteria implemented in the mobile radio terminal.

8. The method according to claim 1, wherein the mobile terminal receives a supporting information item from the base station which indicates that the base station is designed to perform only propagation time recording without reservation of the physical channel.

9. A mobile radio terminal configured to be localized by at least one base station, comprising:
a connection setup unit for setting up a connection with the at least one base station in a mobile radio network;
a propagation time detection unit for detecting a signal propagation time between the mobile radio terminal and the at least one base station;
a carrier frequency memory for storing a list of carrier frequencies that are determined when the mobile radio terminal is in a turned-on state, each carrier frequency having a respective base station and the carrier frequencies being organized according to decreasing reception strength at the location of a mobile radio terminal; and
a channel request message generation module for generating a channel request message for the base station, wherein the channel request message is provided in order to prompt the base station to determine a physical channel for transmitting further messages and to reserve the physical channel in order to set up a connection,
wherein the channel request message is stored at the first position in the carrier frequency memory in response to a message generation command from the connection setup unit or from the propagation time detection unit; and a channel allocation message evaluation module for evaluating channel allocation messages, the value of the signal propagation time being taken and forwarded to the propagation time detection unit and the values of the channel parameters being taken and forwarded to the connection setup unit,
wherein the channel request message generation module is configured to insert a propagation time detection information item into the channel request message in response to the message generation command from the propagation time detection unit in order to signal to the at least one base station that only propagation time detection needs to be carried out without reservation of the physical channel.

10. The mobile radio terminal according to claim 9, wherein the channel allocation message evaluation module only takes the value of the signal propagation time from the channel allocation message in response to a message evaluation command and ignores the values of the channel parameters.

11. The mobile radio terminal according to claim 9, wherein the channel request message generation module generates and sends a respective channel request message to at least one respective base station whose carrier frequencies are stored in the carrier frequency memory.

12. The mobile radio terminal according to claim 11, wherein the at least one respective base station is not permitted to set up a connection according to the cell and/or network selection criteria implemented in the mobile radio terminal on the basis of the mobile radio standard used.

13. The mobile radio terminal according to claim 9, wherein the mobile radio terminal reads and stores a supporting information item indicating whether the base station is designed to perform just propagation time detection without reservation of the physical channel in the carrier frequency memory associated with the appropriate carrier frequency.

14. A base station configured for localizing a mobile radio terminal, the base station comprising:
a channel request message evaluation module that generates a signal propagation time measurement command and a channel allocation command in response to evaluation of a channel request message, wherein the channel request message is provided in order to prompt the base station to determine a physical channel for transmitting further messages and to reserve the physical channel in order to set up a connection;
a signal propagation time measurement module that records the value of a signal propagation time between a mobile radio terminal, from which the channel request message has been received, and the base station in response to the signal propagation time measurement command from the channel request message evaluation module, and stores the value of the signal propagation time in a signal propagation time memory;

a channel allocation module that determines the physical channel for the connection setup between the base station and the mobile radio terminal in response to the channel allocation command from the channel request message evaluation module, and reserves the physical channel in a channel use memory and stores values for channel parameters of the reserved channel in a channel parameter memory; and a channel allocation message generation module that generates a channel allocation message in response to the value of the signal propagation time and the values of the channel parameters of the reserved physical channel, said channel allocation message containing the value of the signal propagation time and the values of the channel parameters of the reserved channel which value of the signal propagation has been taken from the signal propagation time memory and which values of the channel parameters of the reserved channel have been taken from the channel parameter memory;

wherein the channel allocation module is configured to not reserve the physical channel in the channel use memory in response to evaluation in the channel request message evaluation module of the channel request message if the channel request message contains a propagation time detection information item, the propagation time detection information item indicating that only propagation time detection needs to be carried out without reservation of the physical channel.

15. The base station according to claim 14, wherein the base station transmits a supporting information item to the mobile radio terminal, the supporting information item indicating that the base station is configured to evaluate the channel request message to determine whether the propagation time detection information item is present.

16. A method for detecting a signal propagation time between a mobile radio terminal and a base station for the purpose of localizing the mobile radio terminal, the method comprising the steps of:

receiving a channel request message from the mobile radio terminal, wherein the channel request message is provided in order to prompt the base station to determine a physical channel for transmitting further messages and to reserve the physical channel in order to set up a connection;

forming a channel allocation message in the base station, wherein the channel allocation message comprises:
data related to channel parameters of the physical channel reserved in the base station for transmitting further messages in accordance with the channel request message;
a signal propagation value for synchronizing the mobile radio terminal to a timeslot pattern in the base station in order to continue connection setup; and transmitting the channel allocation message to the mobile radio terminal, wherein the channel allocation message is used to form a propagation time detection information item to be inserted into the channel request message at the mobile radio terminal in order to use the channel request message to signal to the base station that only propagation time detection needs to be carried out without reservation of the physical channel.

17. The method according to claim 1, wherein the channel reserved in the base station comprises a virtual channel.

18. The method according to claim 17, wherein data related to channel parameters of the virtual channel is stored as constants not corresponding to the physical channel.

19. The method according to claim 17, wherein the channel reservation comprises a virtual channel reservation, and wherein the virtual channel reservation is monitored by a timer configured to time out at zero seconds.

20. The method according to claim 19, wherein the virtual channel is immediately released when the timer times-out.

21. The method according to claim 16, wherein the channel reserved in the base station comprises a virtual channel.

22. The method according to claim 21, wherein data related to channel parameters of the virtual channel is stored as constants not corresponding to the physical channel.

23. The method according to claim 21, wherein the channel reservation comprises a virtual channel reservation, and wherein the virtual channel reservation is monitored by a timer configured to time out at zero seconds.

24. The method according to claim 23, wherein the virtual channel is immediately released when the timer times-out.

25. The method according to claim 3, wherein the parameter value comprises a bit combination from a plurality of bit combination, and wherein the bit combination is reserved for future use in the GSM standard.

26. The method according to claim 3, wherein the parameter is the Establishment Cause parameter of the GSM standard.

27. The base station according to claim 14, wherein the channel allocation module is configured to reserve a virtual channel.

28. The base station according to claim 27, wherein the channel allocation module is configured to access a memory device storing, as constants, channel parameter values for the virtual channel, wherein the constants do not correspond to the physical channel.

29. The base station according to claim 27, wherein the virtual channel is monitored by a timer configured to time out at zero seconds, and wherein at the time-out, the virtual channel is immediately released.

30. The base station according to claim 27, wherein the channel request message evaluation module is further configured to transfer a channel allocation command to the channel allocation module to configure the reservation of the virtual channel.

31. The base station according to claim 14, wherein the channel request message evaluation module is further configured to evaluate an Establishment Cause parameter of the GSM standard for a bit combination, wherein the bit combination is unused or is reserved for future use in the in the GSM standard.

* * * * *

UNITED STATES PATENT AND TRADEMARK OFFICE
CERTIFICATE OF CORRECTION

PATENT NO. : 7,710,890 B2 Page 1 of 1
APPLICATION NO. : 10/554817
DATED : May 4, 2010
INVENTOR(S) : Klöppel et al.

It is certified that error appears in the above-identified patent and that said Letters Patent is hereby corrected as shown below:

Please amend the Title page of the patent as follows:

(30) Foreign Application Priority Data
May 19, 2004 (DE) ..........................~~10 2004 026 79~~ 10 2004 025 792.2

Signed and Sealed this

Twenty-eighth Day of September, 2010

David J. Kappos
*Director of the United States Patent and Trademark Office*